: 3,309,407
Patented Mar. 14, 1967

3,309,407
PROCESS OF PURIFYING METHYL ETHYL KETONE
Sammy Carpenter, Wallace E. Taylor, and William T. McNair, Jr., Corpus Christi, and Frank T. Talbert, Bay City, Tex., assignors to Celanese Corporation of America, New York, N.Y., a corporation of Delaware
No Drawing. Original application Dec. 27, 1961, Ser. No. 163,010, now Patent No. 3,228,985, dated Jan. 11, 1966. Divided and this application Aug. 20, 1965, Ser. No. 505,440
2 Claims. (Cl. 260—593)

The subject application is a division of U.S. Ser. No. 163,010, filed Dec. 27, 1961, and now U.S. Patent No. 3,228,985 entitled Process for Purifying Methyl Ethyl Ketone.

This invention is concerned with the purification of ketone-containing streams. It more particularly refers to the purification of a stream comprising methyl ethyl ketone.

When methyl ethyl ketone is produced, the crude product often contains impurities therein which are undesirable in a salable product. These undesirable impurities can include formaldehyde, methyl vinyl ketone, methyl isopropenyl ketone, butyraldehyde and/or biacetyl.

It is an object of this invention to remove these undesirable impurities from a crude stream containing methyl ethyl ketone. It is another object of this invention to provide a process for purifying crude methyl ethyl ketone. It is a further object of this invention to provide a process including chemical treatment to produce solvent-grade methyl ethyl ketone. It is a still further object of this invention to purify a methyl ethyl ketone-ethyl acetate composition. Other and additional objects will become apparent from a consideration of the following description of this invention.

In accord with and fulfilling these objects, this invention includes, as one of its aspects, the method of purifying a crude product stream containing a substantial proportion of methyl ethyl ketone, which method comprises extracting color bodies, acids and formaldehyde; azeotroping out water and lower alkanols; chemically treating the azeotroped product by hydrogenating or oxidizing; and distilling the hydrogenated or oxidized product.

More particularly, this invention includes the purification of a stream whose major constituents are methyl ethyl ketone and/or ethyl acetate. This purification includes extractive distillation of the crude stream with dilute sodium carbonate to remove acetic acid, biacetyl, and formaldehyde; extracting the stream with n-pentane to form a two-phase liquid; removing the water by decantation of the aqueous phase followed by azotropic distillation of the remaining water, methanol and ethanol as well as the above-added pentane; chemically treating the dry stream to remove unsaturated carbonyls and butyraldehyde by either hydrogenating or oxidizing them; and then separating the predominantly methyl ethyl ketone-ethyl acetate product from the heavy ends by distillation.

The extractive distillation step is carried out by introducing the crude stream into a distillation column at an intermediate height. A dilute sodium carbonate solution is introduced into the top of the column. In starting up this extraction operation, sodium carbonate is charged into the reboiler and heated with the column under total reflux until water vapor starts up the column whereupon the crude stream is introduced into the tower. The column is continued under total reflux until equilibrium conditions are reached whereupon distillate and reffinate are tapped off.

It is convenient to operate this extractive distillation column at a reflux ratio of about 2 to 1 after equilibrium conditions are reached. The column is suitably operated at about atmospheric pressure with a pot temperature of less than about 101° C., preferably about 98 to 101° C., and an overhead temperature of about 77 to 79° C. It is convenient to employ substantially equivalent feed rates of sodium carbonate solution and crude stream; and to use about 1 to 5 weight percent sodium carbonate solution. The distillation column is preferably a tray column with between about 10 and about 50 trays. Suitably, the crude stream is introduced somewhere in the middle third of the column, preferably toward the lower part of this middle third. A thirty-tray tower has been found to work quite well with the crude stream introduced at the 10th tray.

The extracted stream is dried with n-pentane, suitably by mixing the extracted stream with pentane and permitting the mixture to stand until the mixture separates into an aqueous phase and an organic phase. The aqueous phase is the heavier of the two and can be utilized in the preparation of the sodium carbonate solution referred to in the extractive distillation step above. The lighter, organic phase is subjected to distillation wherein water-pentane-methanol-ethanol azeotropes are distilled out overhead and the product taken as a base stream. The distillate can be subjected to a water extraction if desired to recover alcohol-free pentane which can be recycled back into the column and/or recycled to the drying step referred to above. The water-alcohol mixture resulting from this extraction can be suitably separated by known techniques.

It is convenient to utilize an n-pentane feed rate substantially equal to the feed rate of extractive distilled crude. The organic phase of the decantation separation is preferably fed into the middle third of a column having between about 10 and 50 plates. Where the column has about 30 plates, it is best to introduce the organic phase at about the 10th plate with the recycle pentane introduced at about the 30th plate. The base in the column is suitably at least about 79° C., preferably 79 to 81° C. the overhead temperature is suitably less than about 35° C., preferably 33 to 35° C., and the column preferably operates at about atmospheric pressure. Where a water extraction of the alcohol-pentane distillate is employed, the extractor is suitably of the packed type, utilizing for example Raschig rings or Berl saddles as packing.

The base or product stream, after the drying step, contains as substantial impurities only high boilers, butyraldehyde and unsaturated carbonyls. In one aspect of this invention, this base stream is subjected to hydrogenation in order to remove the unsaturated carbonyls and butyraldehyde therefrom.

One method of hydrogenating the base stream referred to above is to react it with hydrogen under pressure using a Raney nickel type catalyst. This hydrogenation operation preferably uses pelletized Raney nickel as the catalyst and operates under a hydrogen pressure of about 10 to 100 p.s.i.g., preferably 50 to 100 p.s.i.g.; at a temperature of about 90 to 160° C., preferably 100 to 145° C., and at a throughput rate substantially less than that necessary to flood the catalyst bed. For a ½ inch diameter catalyst bed, flow rates of about 125 to 425 grams of stream to be hydrogenated per hour per 100 grams of catalyst have been found to be quite useful.

It is preferred to use as a catalyst a 50% nickel-aluminum alloy, such as for example that sold by the Harshaw Company as NI-3000-T, which has been 10% activated, i.e. 10% of the aluminum in the catalyst has been reacted with caustic. The proporition of aluminum in the catalyst which has been reacted with caustic to activate the catalyst is in no way critical. A preferred catalyst bed ½ inch in diameter of 200 grams of pelletized Raney nickel (3/16 inch pellets) operated at about 100°

C. and at pressures higher than 46 p.s.i.g. completely removed butyraldehyde and unsaturated carbonyls from a 500 milliliter per hour stream containing 75% ethyl acetate-methyl ethyl ketone, 1.4% methyl isopropenyl ketone and 0.11% butyraldehyde. At 100 p.s.i.g. and a flow rate of 1320 milliliters per hour through the same catalyst bed, temperatures in excess of 140° C. caused all butyraldehyde to be removed. Under the same flow rate at the same pressure through the same catalyst all butyraldehyde was removed from a 1% butyraldehyde-99% methyl ethyl ketone mixture at 160° C. Hydrogenation at temperatures and pressures set forth above has been carried out through catalyst beds specified above at throughput rates of 300 to 1800 milliliters per hour.

An alternative process for removing unsaturated carbonyls from a methyl ethyl ketone containing stream is to oxidize the stream. In this process, a stream containing methyl ethyl ketone and/or ethyl acetate as well as methyl vinyl ketone and methyl isopropenyl ketone is subjected to selective ozonolysis which consumes carbonyls with conjugated unsaturation, with substantially no attack upon saturated ketones and esters in the stream.

Ozonolysis is carried out by introducing the stream to be oxidized into a reactor at about 0 to 25° C. under atmospheric pressure with ozone or ozonized oxygen bubbled through the stream to be oxidized. Ozone is continuously bubbled through the stream being oxidized at a rate of about one equivalent of ozone per equivalent of compound to be oxidized, or an amount of ozone very slightly in excess of one equivalent. It is preferred to employ molecular equivalents of ozone and unsaturated compounds being oxidized. The contact time of the stream being oxidized with the ozone is about 1 to 2 minutes. This process can be carried out either batchwise or continuously. Since ozone does not attack saturated carbonyls as long as there are unsaturated compounds present, it is important that the temperature, pressure, throughput rate, and contact time be so chosen within the ranges above-specified that substantially all the unsaturated compounds are oxidized during ozonolysis but that the conditions be such as to prevent oxidation of the saturated compounds in the stream.

With a stream containing 50 weight percent methyl ethyl ketone, 20 weight percent ethyl acetate, and 1.5 weight percent of a mixture of methyl isopropenyl ketone and methyl vinyl ketone, the optimum conditions were 25° C., atmospheric pressure, and 1 equivalent of ozone per equivalent of unsaturated carbonyls in the stream being oxidized. Under these conditions, ozonolysis consumed all the unsaturated compounds but the consumption of saturated compounds was limited to less than 1%.

A further alternative procedure for removing unsaturated carbonyls from a stream containing methyl ethyl ketone and/or ethyl acetate is to hydrogenate the stream with the aid of a palladium catalyst. In this process a catalyst of palladium is used on a carbon support. The catalyst preferably constitutes about 3 to 5 weight percent of the reactants, and the palladium content of the catalyst is about 0.2 weight percent. The stream being hydrogenated is introduced into a reactor operating at about 100° C. and about 50 p.s.i.g. which reactor has a catalyst bed of about 10 grams of catalyst. Throughput rate of the stream being hydrogenated is conveniently about 200 milliliters per hour if the reactor is operated continuously. Batchwise operation is also contemplated according to this invention.

The alternative chemical processes set forth above are suitably carried out on a methyl ethyl ketone stream containing unsaturated carbonyl impurities after such stream has been subjected to pentane drying and extraction of color bodies therefrom. It is, of course, within the spirit and scope of this invention to eliminate one or more of these operations where the composition of the stream being purified does not warrant such operation. In some cases it may be practical to change the order of the operations set forth above e.g. the chemical processing step can precede the pentane drying step, or one or more of the operations can be combined into a single operation.

One such combined treatment involves the oxidation of a crude stream containing methyl ethyl ketone and/or ethyl acetate, unsaturated ketones and aldehydes, and color bodies, e.g. biacetyl, combined with pentane extraction of the products or intermediates. In this treatment, potassium permanganate and caustic are used to oxidize the crude stream.

More specifically, a potassium permanganate solution, containing at least 3 grams of potassium permanganate per 100 grams of crude stream and preferably a saturated solution, is thoroughly mixed with the crude stream to be purified and the mixture fed into a pentane extraction column which can have caustic fed thereto. In one embodiment of this modification, potassium permanganate solution and crude stream are fed into a centrifugal pump and thoroughly mixed therein. The thus mixed stream and permanganate are fed into a second centrifugal pump into which a caustic solution is also fed. The efflux of the second pump is fed into a contactor column into which pentane is also fed. The organic phase of the column is taken overhead and distilled to remove pentane.

In another embodiment of this modification, the second mixing pump set forth above is eliminated with the caustic being added to the pentane contactor column. In this embodiment, caustic treatment and separation of the product stream from the impurities by pentane extraction is carried out simultaneously.

In a further embodiment of this modification, two packed contacting columns are employed with the pentane extraction of the permanganate-crude stream oxidation product being carried out in one column and the caustic treatment of the extracted product being carried out in a second column.

In any of the embodiments set forth above, the contacting column or columns can be packed columns or rotating disc columns as desired. It is convenient to introduce the pentane feed at the base of the column, the caustic solution at the top of the column, and the permanganate-crude stream oxidation product at an intermediate point along the column height. The product is taken overhead with the aqueous stream of impurities taken as a raffinate. It is preferred to cool the feed lines in order to minimize vaporization losses in the feed streams. Water at 9° C. has been effectively used for this purpose. Where packed columns are used, the packing can be conventional Raschig rings or Berl saddles.

It is within the scope of this modification of this invention to use about 10 to 40 weight percent aqueous solution. There should be about 2.5 grams of sodium hydroxide per 100 grams of crude stream fed. Extraction is conveniently carried out with n-pentane using about twice the volume of stream to be extracted. The n-pentane recovered from the distillation of the extraction product is suitably recycled to the extraction column. Where a rotating disc column is used, the discs suitably are rotated at about 2400 to 2700 r.p.m. It is practical to use a 30-plate distillation column for separating the pentane from the organic phase of the contacting or extracting column.

Regardless of which of the above chemical processing operations are utilized or what combination of operations is used to remove unwanted impurities from the crude stream, it is most desirable to subject the product to distillation in which the salable product is taken overhead as the distillate and certain heavy fractions are removed in the raffinate. This final distillation is carried out at a throughput rate of about one liter per hour with the column operating at a reflux ratio of about 4 to 1. Column temperature is at least about 101° C., preferably 101 to 103° C. base, and less than about 78° C., preferably 76 to 78° C. overhead. The column is operated at about atmospheric pressure. It is convenient to use a 30-tray column with the feed at about the 10th tray. Table I, below, is a compilation of data indicating the stream composition at each stage of the purification:

TABLE I

[Weight percent]

| | Crude | Na$_2$CO$_3$ Distillate | Azeotropic Distillate | Hydrogenation Product | Final Distillate |
|---|---|---|---|---|---|
| Methyl ethyl ketone | 49 | 50 | 61 | 59 | 64 |
| Ethyl acetate | 20 | 18 | 23 | 23 | 25 |
| Water | 10 | 12 | Trace | Trace | Trace |
| Ethanol | 5 | 6 | Trace | Trace | Trace |
| Methanol | 1 | 2 | Trace | Trace | Trace |
| t-Butanol | 1 | 1 | 1.3 | 3.8 | 2 |
| s-Butanol | 1 | 1 | 1.3 | 3.8 | 4 |
| Methyl isopropenyl ketone | 1 | 1 | 1.3 | | |
| Methyl vinyl ketone | 1 | 1 | 1.3 | | |
| Biacetyl | 1 | Trace | Trace | | |
| Formaldehyde | 1 | | | | |
| Butyraldehyde | Trace | Trace | Trace | | |
| Methyl propionate | 2 | 2 | 2.6 | 2.6 | 3 |
| Ethyl propionate | 2 | 2 | 2.6 | 2.6 | |
| Propyl acetate | 1 | 1 | 1.3 | 1.3 | |
| s-Butyl acetate | 1 | 1 | 1.3 | 1.3 | |
| Methyl isopropyl ketone | 2 | 2 | 2.6 | 2.6 | |
| Di ethyl ketone | | | | | 1 |
| Methyl acetate | | | | | 1 |
| Acetic acid | 1 | | | | |

The purification procedure followed to obtain the data set forth in Table I above was as follows:

Sodium carbonate extraction was with an aqueous solution containing 2 weight percent dry sodium carbonate.

Pentane drying utilized a volume of n-pentane equal to that of the extraction product above. Azeotroping was with a 30-tray column with the feed entering the 10th tray, base temperature at 79 to 81° C. and overhead at 33 to 35° C.

Chemical treatment was by hydrogenation in a tube reactor ½ inch diameter and 3 feet long, packed with 200 grams of 3/16 inch Raney nickel pellets operating at 144° C., 100 p.s.i.g. and 1 liter per hour throughout.

Final distillation was in a 30-tray, 2-inch column operating at a reflux ratio of 4 to 1 with the base at 101 to 103° C., the overhead taken at 76 to 78° C., and a throughput of 1 liter per hour to the 10th tray.

It is to be understood that this specification is given by way of example only, and nothing contained herein is in any way limiting on this invention.

Having described our invention, what we desire to secure by Letters Patent is:

1. The process of purifying a main stream containing methyl ethyl ketone and ethyl acetate mixed with impurities which include methyl lower alkenyl ketones, lower alkyl alkanoates, lower alkanols, biacetyl, methyl isopropyl ketone and acetic acid which process comprises:
   (1) subjecting said mixture to extractive distillation with an aqueous sodium carbonate solution;
   (2) drying the extractive mixture;
   (3) oxidizing the mixture with an oxidant selected from the group consisting of ozone and alkaline potassium permanganate; and
   (4) distilling the oxidized mixture to recover said methyl ethyl ketone in substantially purer form than said original mixture.

2. The process of claim 1 wherein said steps (2) and (3) are carried out simultaneously.

No references cited.

LEON ZITVER, *Primary Examiner.*

DANIEL D. HORWITZ, *Examiner.*